(12) United States Patent
Gonzaga

(10) Patent No.: US 6,857,311 B2
(45) Date of Patent: Feb. 22, 2005

(54) RAPID TIRE INFLATION PLANT

(75) Inventor: Tullio Gonzaga, Reggio Emilia (IT)

(73) Assignee: Butler Engineering & Marketing Srl (IT)

(*) Notice: Subject to any disclaimer, the term of this patent is extended or adjusted under 35 U.S.C. 154(b) by 84 days.

(21) Appl. No.: 10/444,515

(22) Filed: May 23, 2003

(65) Prior Publication Data
US 2004/0007057 A1 Jan. 15, 2004

Related U.S. Application Data

(63) Continuation-in-part of application No. 10/045,336, filed on Oct. 23, 2001, now abandoned.

(30) Foreign Application Priority Data

Oct. 30, 2000 (IT) .................................... VR2000A0108

(51) Int. Cl.$^7$ .............................................. B60C 23/02
(52) U.S. Cl. ....................................................... 73/146.2
(58) Field of Search ................................ 73/146, 146.2, 73/146.3, 146.4, 146.8, 146.5; 417/12, 53, 44.1; 152/415, 418, 419

(56) References Cited

U.S. PATENT DOCUMENTS

| | | | |
|---|---|---|---|
| 5,325,902 A | * | 7/1994 | Loewe et al. ................ 152/419 |
| 6,102,667 A | * | 8/2000 | Johnson ........................ 417/53 |
| 6,296,010 B1 | * | 10/2001 | DeLauer ...................... 137/224 |

* cited by examiner

Primary Examiner—William Oen
(74) Attorney, Agent, or Firm—R. Neil Sudol; Henry D. Coleman; William J. Sapone

(57) ABSTRACT

A rapid tire inflation plant comprising a low pressure high flow inflating gas source, an inflation device, a motor, a compressor driven by said motor and a control circuit arranged to control feed of low pressure inflating gas from said inflating gas source to said compressor and the feed of inflating gas at a relatively high flow and pressure to said inflation device.

13 Claims, 2 Drawing Sheets

RAPID TIRE INFLATION PLANT

CROSS REFERENCE TO RELATED APPLICATION

This application is a continuation-in-part of U.S. patent application Ser. No. 10/045,336, filed on Oct. 23, 2001, now abandoned.

BACKGROUND OF THE INVENTION

The present invention regards a rapid tyre inflation plant.

Generally speaking tyres are currently inflated using an inflation device (an inflation pistol provided with, manometer), connected to a distribution network of compressed air. Inflation occurs by inserting air through a check valve for tyres that, as is well known, has a relatively small section for the passage of air, usually of about 3 mm$^2$.

Given the available pressure gradient in normal compressed air distribution networks (with a maximum of 10 bar) and such a small section for air passage, the time taken to fully inflate a tyre is about 50 seconds for a car and ten minutes or more in the case of a road truck. In order to shorten the inflation times it has already been suggested to first dismantle the inner part of the check valve and then to reassemble it after inflation. With such an expedient the time taken to fill the tyre can be reduced to about 5 minutes but it is a very laborious process and in some cases may prejudice the proper working of the valve and thus compromise tyre safety, not least because it may result in possible pressure loss over a relatively short time.

So as to significantly reduce the inflation time, given that it is not possible to increase the section for the passage of air through the tyre check valve, it would be necessary to greatly increase the pressure of the filling gas (air, nitrogen or other inert gas), except for the fact that the limited energy available at the filling sites means it is not usually possible to obtain a sufficient pressure volume flow for the desired pressure. On the other hand, safety considerations rule out the use of a large, high capacity tank with a high internal pressure as the source of the compressed air upstream of the inflation system.

SUMMARY OF THE INVENTION

The main object of the present invention is to provide an inflation plant that makes it possible to fill a tyre in very brief time without dismantling the tyre valve's internal mechanism.

Another object of this invention is to provide structurally very simple inflation equipment that is both high performance and low in its production cost.

These and other objects that will better appear below are achieved, according to the present invention, by a rapid tyre inflation equipment or plant comprising a low pressure high flow inflating gas source and an inflation device, a motor, a compressor driven by said motor and arranged to provide a flow of inflating gas at a relatively high flow and pressure to said inflation device, a control circuit arranged to control feed of low pressure inflating gas from said inflating gas source to said compressor, and a turbine suitable for the exploitation of energy deriving from the inflation gas supplied thereto from said control circuit at a relatively large flow and low pressure coming from the said inflating gas source.

BRIEF DESCRIPTION OF THE DRAWINGS

Further aspects and advantages of the present invention will better appear from the following detained description of a presently preferred embodiment thereof, with reference to the accompanying drawings, in which.

In the accompanying drawings the same or similar parts are indicated with the same reference numerals.

DESCRIPTION OF THE PREFERRED EMBODIMENTS

Figure 1:
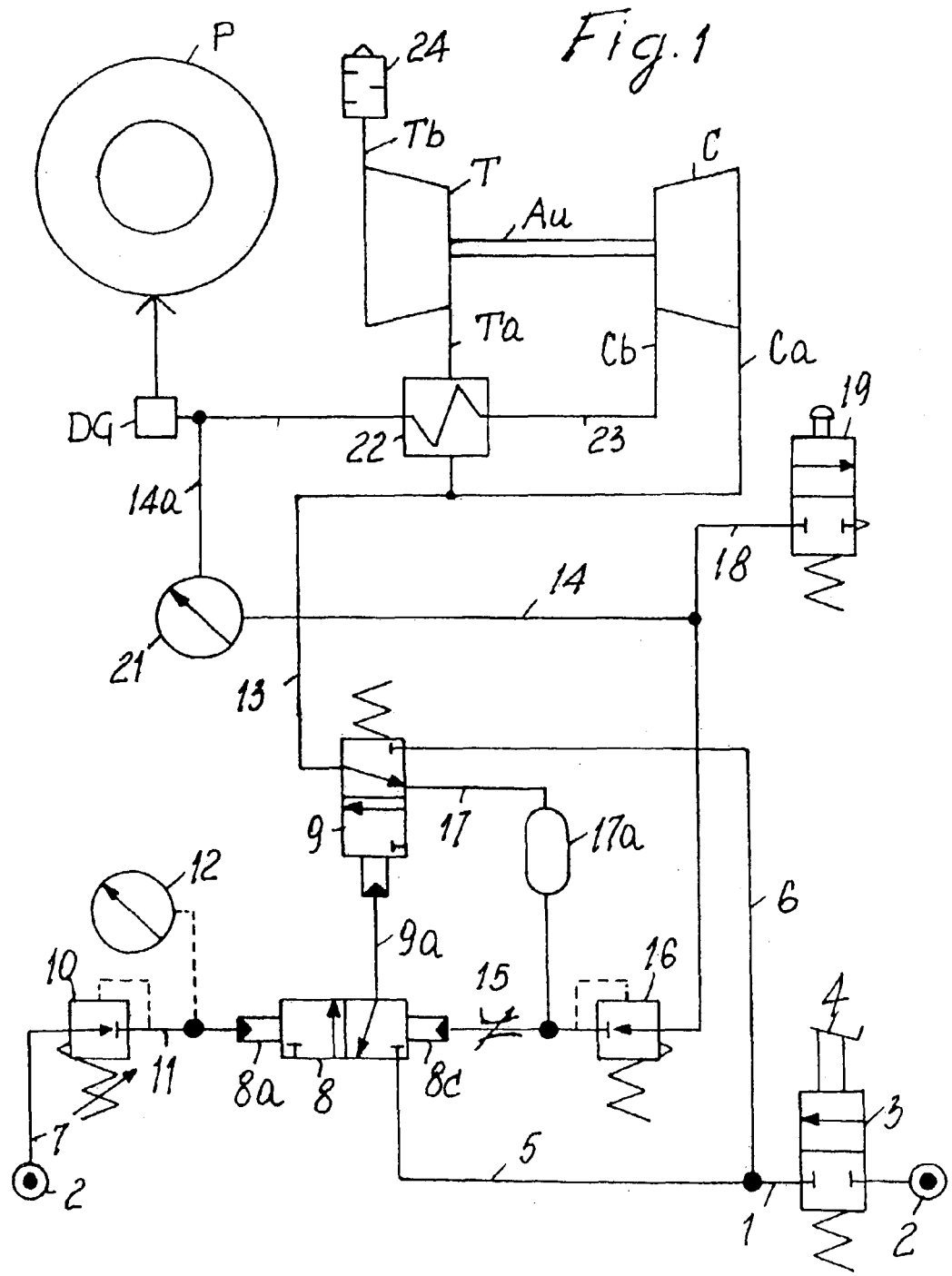
FIG. 1 shows a diagrammatic view of a first embodiment of the plant in accordance with the present invention.

With reference first to the embodiment shown in FIG. 1, a rapid tyre control inflation equipment or plant, comprises a compressor C, a turbine T, an inflation device DG and a controlled tyre pressure transmission circuit CTP.

The controlled tyre pressure circuit CTP comprises a connection pipe 1, from an inflation gas source (generally indicated as 2, but not shown in detail in the drawings), that may be of any suitable type, for example a motor-driven compressor possibly with a pressurised compressed air tank, has an open/close valve 3, preferably activated by a pedal 4. Two ducts 5 and 6 come out of the connection pipe, one to a pressure comparison valve 8 and the other to a switching valve 9.

The inflation gas source 2 is also directly connected by a duct 7 to a pressure reducer 10, whose output, via a pipe 11 with a manometer 12 setting the inflation pressure, is connected to a first input 8a of pressure comparison valve 8, which is designed to control the switching valve 9, whose output is for this reason connected to a control circuit 9a of the switching valve. The pressure comparison valve 8 is arranged to control the switching valve 9, which is directly supplied by the source 2 through the duct 6, while, in its turn, this feeds along duct 13 both an input Ta to turbine T and an input Ca to the compressor C.

A second input 8c of pressure comparison valve 8, by way of a duct 14 along which are connected in series a constrictor 15 and a fixed non adjustable pressure reducer 16, is, connected to a control manometer 21, as will be explained in further detail below. At its length comprised between the constrictor 15 and the pressure reducer 16, the duct 14 is in communication with the switching valve 9 by way of a pipe 17 with an interposed compensation tank 17a. In addition, from the duct 14 a duct 18 branches off which is in communication with a discharge valve 19, e.g. of a button type, whose working will be explained below.

Before the duct 13 reaches the input Ta to the turbine T, it has a coil section located in a heat exchanger 22 to absorb heat to preheat the compressed air from the source 2 before it enters the turbine T. The preheating heat is provided by a length of duct 23 connected to output Cb of the compressor C and directed to the inflation device DG of a tyre P that is to be filled.

Downstream of the heat exchanger 22, the duct 23 by way of duct 14a is in fluid communication with the control manometer 21 and then through duct 14, the pressure reducer 16 and the constrictor 15 with an input 8c of the pressure comparison valve 8.

As is schematically indicated in FIG. 1, the output shaft Au of the turbine T is operatively directly connected to compressor C in order to activate this latter. The turbine T has a discharge output Tb, preferably fitted with a silencer 24.

The operation of the above described equipment is very simple and reliable.

Once the DG inflation device has been set up and connected to the usual inflation valve included with a tyre P, and the manometer 12 has been set at the desired pressure for the tyre type and performance rating, the operator steps on the pedal 4 to open valve 3 and connect both the turbine T and the compressor C to the compressed air source 2 that supplies air at relatively low pressure. The available flow in a normal compressed air source 2 in an inflation station is usually about 4000 N1/min at about 10 bar.

The pressure comparison valve 8, on the one side, through its input 8a measures the preset inflation pressure through its own input while, on the other side, its input 8c measures the actual pressure during filling, i.e. that present in the tyre itself P. As long as there is an imbalance between the two pressures, i.e. that set for the manometer 12 and that reached in the tyre P, the pressure comparison valve 8 will keep the switching valve 9 open, and when this balance has been reached, with the preset pressure obtained, the switching valve is caused to be closed so the supply of compressed air is cut off both to the turbine T and to the compressor C.

In practice this balance is obtained gradually in successive stages and, to ensure the switching valve 9 stays closed until the set inflation pressure is reached, the tank 17a acts as a compensation reservoir to make the working of the valve both precise and sensitive.

As has already been indicated, a part of the air from the source 2 at about 10 bar is sent to the turbine T passing first through the heat exchanger 22, where it is preheated to increase the performance efficiency of the turbine T. The preheating heat is provided by the strongly compressed air, e.g. at 40 bar, coming from the compressor C, the temperature of the air having been markedly raised to as much as about as 150° C. as a result of its being compressed.

The flow of compressed air from a typical inflation station is, as was stated earlier, about 4000 N1/min at 10 bar, while the flow that is required to obtain rapid inflation is of the order of 500 N1/min at 40 bar. The energy balance between available power in an inflation station is therefore W=4000× 10=40,000 and that necessary for rapid inflation of $W_1$=500×40=20,000 is decidedly favourable to the solution created by the present invention.

The energy required to activate the compressor C is supplied by the turbine T that is fed with a part of the compressed air coming from the source 2, thus at the same pressure as that supplied to the compressor, thus having a compression factor of about 4.

The turbine T, like the compressor C, can be of any suitable type according to the needs of the job in hand. They may for example be dynamic axial or radial, action or reaction.

Once compressed air supplied by the compressor C has crossed the heat exchanger 22 it enters the tyre P directly through the control valve or inflation device DG. Given that the high pressure output line 23 from compressor C consists of a single pipe or duct with no intermediate shutoff devices except for the inflation valve DG, the inflation fluid under relatively high pressure flows unimpeded into pipe 23, thus allowing relatively large volumes of fluid to pass per unit of time enabling the time for the filling of the tyre P to be reduced.

Since the compressor P has sufficient capacity to obtain rapid inflation, it is not necessary to have any kind of reserve such as a tank, for the carrying out of the inflation process. As a result, when the inflation process has been completed no component is subject to high pressure, making the equipment very safe.

Apart from the inflating device DG that is activated by the operator, all the controls are low pressure commands and so have long term reliability.

Compressor C pressure and, flow, given the fixed volume ratio between the compressor C and turbine T, are directly proportional to the air discharged from the turbine. It is sufficient therefore to adjust the turbine discharge into the atmosphere to vary, within a certain field of use, the power of the turbocompressor (multistage centrifugal blower) C, T and so obtain 3 specific inflation time set for a determined type of tyre P to be filled.

Figure 2:
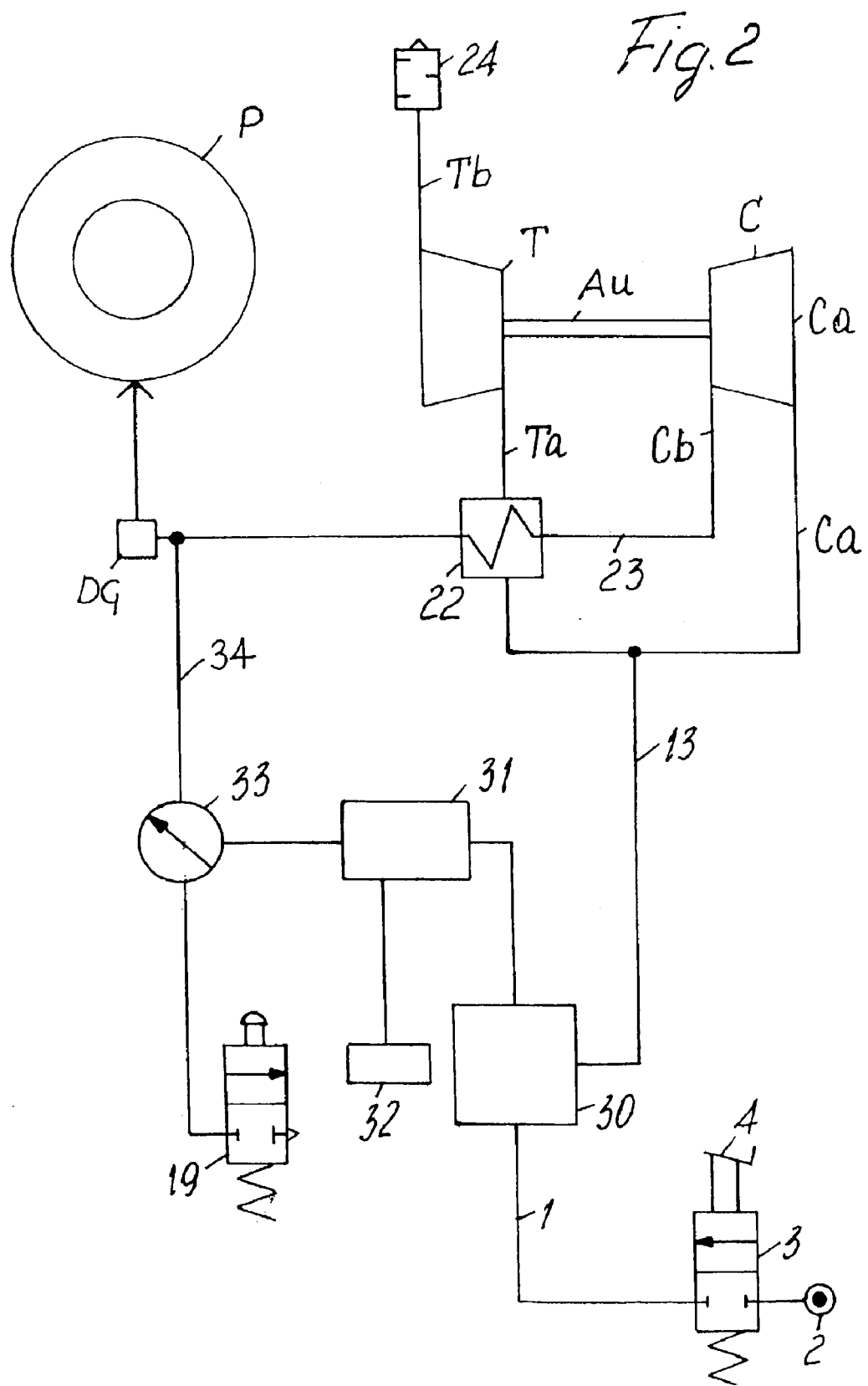
FIG. 2 shows a block diagram illustrating a second embodiment of the present invention.

In the embodiment shown in FIG. 2 the turbocompressor unit T, C is controlled by an electronic control circuit CCE comprising a power actuator 30 of any suitable kind, including a solenoid connected at its input to the supply pipe 1 while its output connects with duct 13. The power actuator 30 is controlled by an electronic control unit 31, that includes, as is normal in the art, a microprocessor, a microprocessor access keyboard 32 and a control manometer 33, this latter connected by a duct 34 with the output line 23 from the compressor C, to detect the actual inflating pressure.

The control unit 31 compares the actual inflating pressure and a preset maximum inflation pressure in the control unit's memory and locks the supply to line 13 when the actual inflating pressure reaches the preset value.

The whole inflation plant can be made of a suitable size and made suitably compact for mobile use or integrated with an inflation unit such as an inflation cage, a machine for the mounting and dismounting of tyres or similar devices and equipment.

The above described inflation plant may be modified in numerous ways to produce several variants within the ambit of the protection set forth in the claims that follow below.

Therefore, for example, in place of the T there could be an electric motor or motor of some other type.

What is claimed is:

1. A rapid tyre inflation plant comprising
   a low pressure high flow inflating gas source,
   an inflation device,
   a motor,
   a compressor driven by said motor and arranged to provide a flow of inflating gas at a relatively high flow and pressure to said inflation device,
   a control circuit arranged to control feed of low pressure inflating gas from said inflating gas source to said compressor, and
   a turbine suitable for the exploitation of energy deriving from the inflation gas supplied thereto from said control circuit at a relatively large flow and low pressure coming from the said inflating gas source.

2. A plant according to claim 1, comprising a heat exchanger designed to intercept the feed of inflating gas to said turbine and the feed of compressed inflating gas coming from said compressor.

3. A plant according to claim 1, wherein said control circuit comprises a comparator device designed to compare a preset threshold pressure with the actual inflating pressure and shut off the supply of inflating gas when the inflating pressure reaches a preset threshold pressure value.

4. A plant according to claim 3, wherein said comparator device comprises a three-input pressure comparing value and an output arranged to communicate through a first input with said inflation gas source, a switching valve controlled by said comparing valve and communicating with the output of said pressure comparing valve, a threshold-pressure presetting manometer in fluid communication with a second input to said pressure comparing valve, and a manometer detecting the pressure in a tyre that is being inflated in controlled fluid communication with a third input to said pressure comparing valve.

5. A plant according to claim 4, wherein said manometer measuring the pressure in a tyre being inflated communicates with said third input of said pressure comparing valve by way of a pressure reducer, a constrictor connected in series, a compensation tank connected between said reducer said constrictor and said switching valve, and an adjustable pressure reducer between said inflation gas source and said pressure threshold manometer.

6. A plant according to claim 1, wherein said control circuit comprises a control unit including a microprocessor, a microprocessor access keyboard, a control manometer arranged to measure the pressure of the inflation gas at the compressor output, and a power actuator that can be controlled by said control unit and also having an electro-valve connected at its output with the input of said turbine and said compressor, whereas at its first input it communicates with said inflation gas source.

7. A plant according to claim 6, comprising a silencer for the turbine output.

8. A plant according to claim 1, comprising a deflation valve connected to the said compressor output.

9. A plant according to claim 1, comprising a shut-off valve between said inflation gas source and said control circuit.

10. A rapid tyre inflation plant comprising a low pressure high flow inflating gas source, an inflation device, a motor, a compressor driven by said motor and arranged to provide a flow of inflating gas at a relatively high flow and pressure to said inflation device, and a control circuit arranged to control feed of low pressure inflating gas from said inflating gas source to said compressor, wherein said control circuit comprises a control unit including a microprocessor, a microprocessor access keyboard, a control manometer arranged to measure the pressured of the inflation gas at the compressor output, and a power actuator that can be controlled by said control unit and also having an electro-valve connected at its output with the input of said turbine and said compressor, whereas at its first input it communicates with said inflation gas source.

11. A plant according to claim 10, comprising a silencer for the turbine output.

12. A plant according to claim 10, comprising a deflation valve connected to the said compressor output.

13. A plant according to claim 10, comprising a shut-off valve between said inflation gas source and said control circuit.

* * * * *